July 1, 1958  W. J. DONNELLY  2,840,887
METAL CUTTING TOOLS AND ELEMENTS
Filed Nov. 15, 1950  2 Sheets-Sheet 1
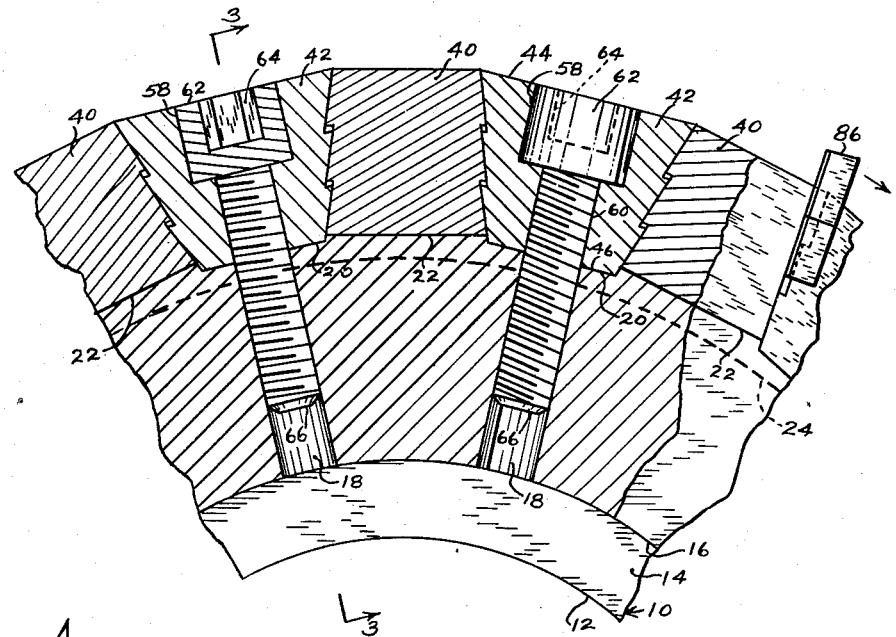
Fig_1
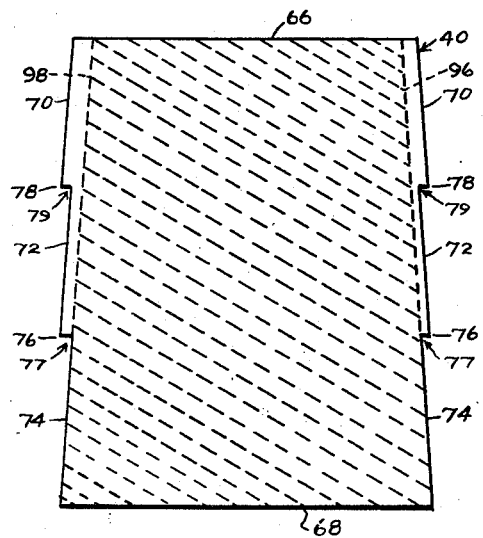
Fig_2
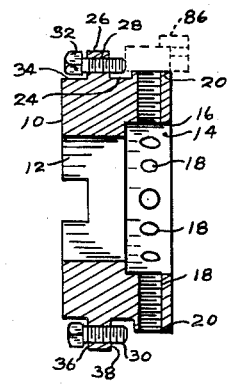
Fig_3
INVENTOR.
Walter J. Donnelly
BY
Peter Fries, Jr.
ATTORNEY

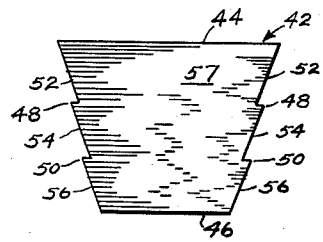
Fig_4
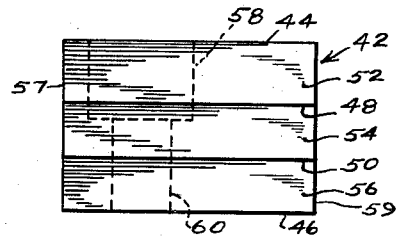
Fig_5
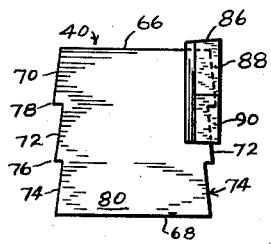
Fig_6
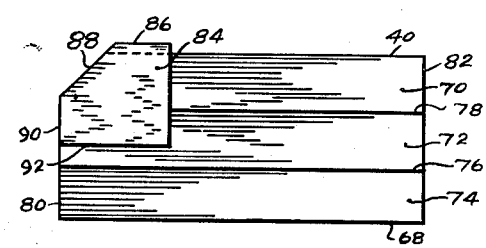
Fig_7
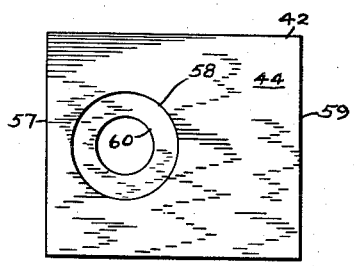
Fig_9
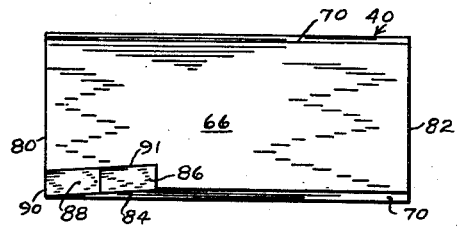
Fig_8
INVENTOR.
Walter J. Donnelly
BY
ATTORNEY United States Patent Office 2,840,887
Patented July 1, 1958

2,840,887

METAL CUTTING TOOLS AND ELEMENTS

Walter James Donnelly, Jackson, Mich.

Application November 15, 1950, Serial No. 195,807

9 Claims. (Cl. 29—105)

This invention relates to improvements in machine tools.

An object of the invention is to provide a novel and improved milling cutter in which a multiplicity of cutting blades are mounted on a cutter body, and in which there is novel means cooperating with the cutter body and the cutting blades for securing the cutting blades on the cutter body, yet permitting easy removal thereof and adjustment when needed.

Another object of the invention is to provide a novel and improved milling cutter in which a plurality of cutting blades or tool bits are disposed about the perimeter of a cutter body, in mutually spaced relationship, and in which a series of mutually spaced wedge members are disposed in the intervening spaces between adjacent tool bits, the wedge members being provided with a series of stepped side faces adapted to engage tightly against a series of corresponding stepped side faces on the cutting blades, the arrangement of the stepped side faces being such that upon tightening the set screws securing the wedge members to the cutter body, the cutting blades are tightly wedged against the cutter body, the arrangement and thickness of the material between opposite faces of the wedge members and also of the cutting blades being greater than usual, with consequent increased stability of the cutting blades while engaged in a milling operation.

A further object of the invention is to provide a novel and improved cutting blade or tool bit for use in a multibladed milling cutter, the blade being provided with opposed face surfaces into which are cut or formed a series of pairs of downwardly divergent steps, the maximum distance between said surfaces in an upper pair of said steps being greater than the minimum distance between the next lowermost pair of said steps.

Still another object of the invention is to provide a novel and improved cutting blade or tool bit for use in a multibladed milling cutter, in which the opposed faces of the cutting blade which are to be engaged by intervening wedge members on the milling cutter body, are discontinuous and stepped, so that the average thickness of the cutting blade between said opposed faces is greater than it would be if the said opposed faces were continuous and outwardly convergent, allowing the cutting blade member to remain much heavier at the top or outer portion thereof, than would be the case in the absence of the stepped type of construction.

Still a further object of the invention is to provide a novel and improved cutting blade or tool bit of sequentially stepped face construction, and a novel and improved wedge member of sequentially stepped face construction to mate with said cutting blade, so as to wedge the same securely in and on the milling cutter body with a higher degree of efficiency than heretofore achieved.

Another object of the invention is to provide a novel and improved construction of machine tool and the like, in which a plurality of cutting blades are mounted upon a machine tool body, at least a portion of the machine tool body being formed of metal which is softer than steel, so that the machine tool has inherent resilience and combined therewith a dampening action by means of which excessive vibration is eliminated, and as a consequence of which both noise and danger of sudden shock destruction of the cutting blades is avoided.

Still another object of the invention is to provide a novel and improved machine tool of the character described, which is simple in design, inexpensive to manufacture, composed of a minimum of parts and of simple design, the parts being generally interchangeable, and the machine tool being adjustable and capable of being completely disassembled without taking down the set up.

Other objects and advantages of the invention will become apparent from the following description of a preferred embodiment thereof as illustrated in the accompanying drawings, forming a part hereof, and in which Figure 1 is a fragmentary front elevational view of a completely assembled milling cutter of the type shown in detail in my copending patent application Serial No. 151,975, filed March 25, 1950, for Metal Cutting Tools, now abandoned, in Figures 1, 2, 3, 4, 5, 15, 16 and 17 thereof, improved however, in accordance with the present invention, Figure 1 of the present application being partly broken out, and viewed similarly to Figure 1 of the said pending application, being an improvement thereon.

Figure 2 is an enlarged right end elevational view of a cutting blade body as seen from the right end of Figure 7, and indicating in broken line overlay thereon an outline end elevation of a prior art cutting blade body of the type, for example, shown in my copending patent application as aforesaid, namely Serial Number 151,975.

Figure 3 is a sectional elevational view taken substantially on plane 3—3 of Figure 1, through the entire cutter body, omitting for purposes of clarity only, the cutting blades, wedge members and retaining screws.

Figure 4 is an end elevational view of one of the wedge members shown in Figure 1, as seen from either right or left end of Figure 5.

Figure 5 is a right side elevational view of the wedge member shown in Figure 4, both sides thereof being the same, as is apparent from the views.

Figure 6 is a left end elevational view of the cutting blade body shown in Figure 7, with hardened cutting edge member carried thereon, as also seen in Figure 1.

Figure 7 is a right side elevational view of the cutting blade body shown in Figure 6.

Figure 8 is a top plan view of the cutting blade body shown in Figure 7.

Figure 9 is a top plan view of the wedge member shown in Figure 5.

This application is a continuation in part of my copending patent applications: (1) Serial Number 74,665, filed February 4, 1949, for Machine Tool, and (2) Serial Number 151,975, filed March 25, 1950, for Metal Cutting Tools. The above mentioned parent application Serial Number 74,665 has become abandoned after the filing of the present application, and of Serial Number 151,975.

In the manufacture of machine tools, and their use, such as milling cutters, hobs, broaches and the like, it is important that the utmost stability of the cutting blades be achieved, so that they are not subjected to any harmful degree of vibration or deflection which might cause them to break or chip off, while a cut is being taken thereby. This is especially important when the newer metal cutting elements are employed, such, for example as tungsten carbide, carboloy, and also high speed steel under certain conditions well known in the art.

The present application discloses a novel machine tool construction and also novel construction of the cutting blade elements and the wedging devices for cooperation therebetween so as to insure the utmost stability and freedom from inherent tendency to vibrate while a cut is being taken. Further, the novel construction of the cutter body itself, introduces a shock absorber action by means of which any sudden shocks which might otherwise destroy or chip off the cutting blade edge as is well appreciated and set forth herein, are absorbed and hence blocked from exerting any destructive effect.

In order to understand clearly the nature of the invention, and the best means for carrying it out, reference may now be had to the drawings, in which like numerals denote similar parts throughout the several views.

As seen best in Figures 1 and 3, there is a milling cutter including a cutter body 10 which is annular in shape, with an axial bore or opening 12 opening upon one face on the left of Figure 3, the bore 12 being enlarged at 14 to open upon the other or right hand face in the same view. The axial bores 12 and 14 permit the mounting of the cutter body 10 on an arbor or other shaft in a machine. The cutter body has an annular outstanding rib 26 throughout a complete 360 degrees, as seen also in my said copending patent application Serial Number 151,975, particularly in Figure 2 thereof and Figure 3, the rib 26 being penetrated by a series of spaced openings 28 all around its periphery as shown, to receive the adjustment screws 30, the heads 32 of which are disposed in the annular groove or recess 34 formed between the left edge 36 of the annular rib 26 and the left face of the cutter body 10 as seen in Figure 3.

An annular groove 24 is formed throughout a complete 360 degrees in the cutter body 10 immediately to the right of the annular rib 26, the groove 24 having a substantial depth as shown, or even somewhat more depth than shown. The groove 24 is also indicated in broken lines in Figure 1, and its purpose has already been explained in detail in my said copending patent application in relation to Figures 1, 2, 3 and 4, and 15, 16 and 17 of that application, Serial Number 151,975, to which reference may be had for such details.

Having formed the annular groove 24 in the cutter body, I then proceed to form a series of planar surfaces 22 in the cutter body to the right of the annular groove 24 as seen in Figure 3, all spaced from each other, and each being tangent to a cylinder of revolution which is coaxial with the axis of the bores 12 and 14, and of greater radius than the radius of the floor of the annular groove 24. These plane surfaces 22 are all equal in length in a direction parallel to the axis of bore 14, and are all equal in breadth in a direction from left to right as seen in Figure 1, for example, that is to say, in a direction tangent to the said cylinder of revolution. The series of mutually spaced plane surfaces 22 thus provide plane seats for the bottom surfaces 68 of each of the cutting elements or bits 40 when placed thereon in the relation shown in Figure 1.

Each of the cutting elements 40 has mounted thereon in any desired position according to the work to be performed thereby, a hardened cutting blade element 86, which may be of any suitable metal cutting material, such as tungsten carbide, carboloy, or even high speed steel, fastened to the cutting blade support or body 40 by any suitable means, such as brazing, welding, or otherwise. It will be understood that the shape of the blade element 86 may be varied also, and its orientation on any exposed part of the body 40, so that it may engage in face milling, straddle milling, or other machine work.

On the sides to the left and right as seen in Figures 1 and 6, of the cutting element body 40, I form a first pair of mutually downwardly divergent surfaces 70 extending from the upper surface 66 to the locations 78, at which point I form a substantially horizontal inward cut or recess to location 79, and thence commence again to form a pair of second mutually downwardly divergent surfaces 72, which are preferably mutually parallel respectively to the surface 70 on their respective sides of the cutting element body 40 as seen in Figures 2 and 6, and extend downwardly to locations 76 as shown. At locations 76, I then again take an inward cut horizontally to locations 77 as seen in Figures 2 and 6, and then commence to form the mutually divergent pair of surfaces 74 which are parallel, on each side of the cutting element body 40 as seen in Figure 6, to their respective surfaces 70 and 72, and extend downwardly to the bottom surface 68 of the cutting element body 40. From Figures 2 and 6, it is seen that there is substantial spacing between locations 66 and 78, 78 and 76, and between 76 and 68. However, from Figure 2 it will be seen that the breadth or thickness of the cutting element body 40, that is, in a direction from left to right, at the top 66, is substantially greater than it would be if the prior art method of formation thereof, by extension of the surfaces 74 from the bottom 68 to the top 66, as indicated in broken lines, in Figure 2, were employed. Hence, by the construction selected and disclosed herein, I am able to make a cutting element body 40 with substantial increase in left to right thickness nearer and at the top surface 66, and extending from location 76, which is about two-thirds of the distance from top to bottom of the cutting element body 40. Hence, by use of this type of construction, the stability and shock receiving and absorbing power of the cutting element body 40 is vastly increased, as well as its resistance to bending or flexure when a heavy cut is being taken. This increases the accuracy of cutting, and also enhances the quality of cut itself, and blocks annoying tool chatter.

The cutting element body 40 is thus allowed to remain much heavier at the top 66 and for some substantial distance downwards toward its base 68, while yet retaining the keystone or wedge shape and its advantages. From Figures 6, 7 and 8, it is seen that the surface of the cutting element body 40 to which the blade element 86 is to be secured, is cut away or recessed sufficiently to receive a portion of the thickness of the hard blade element 86, this being largely dependent upon the thickness and area and location of the blade element 86 on the body 40, only one of many possible positions being shown in the views. As shown, the blade element 86 has a face 84 the upper edge of which projects above the surface 66 of the body 40, so as to take the cut, and has other edges such as 88 which is oblique, 90 and 92. If some other form of milling cut is to be taken, as for example with the work to the left of end surface 80 of the body 40 as seen in Figure 7, then the cutting blade element 86 would have its surface 90 projecting leftwardly of surface 80, instead of employing surface 86 for taking the cut. Those skilled in the art will understand the many possible positions of the cutting blade element 86 to do a great variety of machining operations.

As shown in broken lines in Figure 3, and also in Figures 2, 5 and 15 of my said pending application Serial Number 151,975, the opposite end edge 82 of the cutting element body 40 as seen in Figures 7 and 8 hereof, is preferably brought against the adjusting screws 30, so that turning of the screws 30 will allow movement of the cutting element body 40 toward or away from the annular rib 26, and right across the annular groove 24, thus making adjustable the cutting position of the hard blade 86.

For straddle milling, the present cutter may be used just like the ones shown in my said copending patent application Serial Number 151,975, in Figure 5 thereof. And by alternating the alternate cutting element bodies 40 around the perimeter of the body 10, one body 40 having its cutting blade element 86 nearest the annular rib 26, and the next element 86 on the next body 40 being oriented so as to project nearer or even over the right hand face of the main body 10 as seen in Figure 3, it is possible to mill a pair of parallel grooves in a workpiece, the width of the spacing therebetween being adjustable by means of positioning of the cutting blade elements 86, and/or by adjustment of the screws 30.

To hold these novel shaped cutting element bodies 40 in position on their seats 22, I provide wedge elements 42 between each pair of adjacent bodies 40, as seen in Figure 1. The wedge elements 42, which are shown in further detail in Figures 4, 5 and 9, also have plane bottom surfaces 46, which fit onto their seats 20, which in turn are all tangent to a circular cylinder of revolution the radius of which is greater than the radius of the floor of the annular groove 24 as seen best in Figure 1, and smaller than the radius of the circular cylinder of revolution to which the bases 22 of the cutting element bodies 40 are tangent. Each of the seats 20 has a substantially radial bore 18 opening thereon, the bore 18 being formed through the main cutter body 10 and threaded, and opening at its inner end upon the surface 16 of the cutter body 10.

Each of the wedge members 42 has a top surface 44 which is substantially parallel to its bottom surface 46, and has opposite end surfaces 57 and 59, as shown in Figures 4, 5 and 9, which are mutually parallel and perpendicular to the axis of the bore 12. When in position on the cutter body 10, the end 59 of each wedge member 42 will preferably come right up against the right hand surface 38 of the annular rib 26, and it is seen further that the cutting blade element bodies 40 are preferably and may be longer than the wedge members, this being clear from a comparison of Figures 5 and 7, for example.

Each of the wedge members has a series of sort of steps formed in its side surfaces, as seen best in Figures 1, 4 and 5. Thus, commencing with the top surface 44, I form a pair of mutually convergent downwardly surfaces 52 in opposite sides of the wedge member 42, as seen in Figure 4, extending downwards to level 48. I then leave metal at level 48 and proceed outwardly so as to form a sort of shelf at level 48 on each side of the wedge body 42, and then proceed downwardly again from level 48 for forming downwardly convergent surfaces 54 which may preferably be parallel to their respective surfaces 52 on their respective sides of the body 42 as seen in Figure 4, proceeding downwardly to level 50, and thence proceeding outwardly in a substantially horizontal direction as with level 48, to form a second shelf at level 50 on each side of the wedge body 42.

Then I proceed to form the downwardly convergent surfaces 56, which are respectively parallel to surfaces 54 and 52, on each side of the wedge member 42, proceeding downwards to the level 46 which is the bottom of the wedge member 42, the lowermost downwardly convergent portion of the wedge member body 42 thus being adapted to fit into the seat 20 provided therefor. Each of the wedge member bodies 42 is provided with a radial bore 58 which is reduced at 60 and in alignment with the bores 18, to receive the head and shank respectively of fastening screws 62, which may have socket recesses 64 formed therein, such as Allen screws to receive Allen wrenches for loosening and tightening the screws. It is seen that Figure 1 shows some clearance between the shelf-like portions as at locations 78 and 76 of the cutting element bodies 40 and the adjacent shelf like portions as at loctaions 48 and 50 respectively, of the wedge element bodies 42, and this clearance may be increased as the screws 62 are tightened to take up and wedge further into their seats, the cutting element bodies 40. It is seen further that there is a perfectly secure wedging action obtained to hold down the cutting element bodies on their seats, and that the wedge members 42 are similarly of much greater thickness from left to right as seen in Figure 4 than they might be if the stepped wedge surface arrangement were not used, thus contributing to greater strength, stability, and freedom from chatter and flexure under conditions of heavy and intermittent cuts.

In assembly of the removable elements to the cutter main body 10, it is preferable to first seat every second wedge body 42 on its seat 20, leaving the intermediate wedge body 42 unseated, or at least loose. The cutting element bodies 40 are then inserted on their seats, by endwise motion, for example, that is to say, in a direction perpendicular to the drawing in Figure 1, and then the loose intermediate wedge bodies 42 are tightened down, and it is possible that they may remain partially spaced from their respective seats 20 when that is done, but in any event the entire assembly will be found to be quite secure and tight so that good hard work can be done.

Further, to adjust the position of any of the cutting blades 86, or to remove any of them for sharpening or repair or replacement, it is only necessary to loosen alternate wedge members 42 a little, to permit such to be done, without taking down the entire assembly or set up. Fine lateral adjustment is accomplished by means of the adjusting screws 30 in the annular rib 26 as mentioned above.

In constructing the main cutter body 10, it may be formed of any suitable material, such, for example as iron or steel. I have found however, that other materials may be used to considerable advantage in forming the cutter body 10. Such a material may be much softer than iron or steel, and may for example be aluminum. In actual experimentation, I have formed the main milling cutter body 10 of soft metals such as aluminum, and have found that at least 100 percent increase in life of the individual cutting blades 86 has resulted therefrom. This is quite unusual since the practice and beliefs in the art have been that the cutter body 10 should be of a hard metal such as steel, and such has been followed right up to the present. It has not been suspected by those skilled in the art, though always searching for means for prolonging the life of the actual cutting blades 86, that the solution resides in forming the milling cutter body itself of soft metal such as aluminum instead of steel, but I have found by actual experimentation and careful check of the life of the hard cutting blades 86, that their life has been increased by as much as 100 percent, at least 100 percent over that when steel milling cutter bodies were used with the same blades.

The modulus of elasticity of the aluminum cutter body 10 differs sufficiently from that of steel to greatly affect the life of the hard cutting blades such as tungsten carbide, especially when subjected to rough work on deep and intermittent cuts. The aluminum has a deadening or dampening characteristic something like a shock absorber action, between the hard steel spindle of the machine, upon which the milling cutter body 10 is mounted, and the extremely hard tungsten carbide of the tool 86 which makes the cut. Further it is thus seen that any sudden shocks which might damage the tungsten carbide blade, are instead transmitted to the aluminum main cutter body 10 and absorbed within the aluminum body 10, and damped out, rather than allowed to affect the tungsten carbide blade. In addition, I have found that there is less noise and vibration effect on the ears of the machinist, since when the aluminum cutter body 10 is used, it is less noisy and sounds smoother in operation.

Also, the aluminum cutter body 10 being of softer metal, is easier to machine when manufacturing the same, and is much less expensive to make. Additionally, it is much lighter than steel, and easier to handle and set up in the milling machine, making it easier also to store and transport.

Although I have described my invention in specific terms, it will be understood that various changes may be made in size, shape, materials and arrangement without departing from the spirit and scope of the invention. It will also be understood that my novel aluminum milling cutter body may be employed for use in milling cutters of other shapes and designs, being easily modified for that purpose, to gain its many advantages enumerated herein.

It will also be understood that the unique wedge hardened construction disclosed herein permits the use of not only the steel body of the cutter, but also aluminum, cast iron, brass, bronze, copper, or even plastic materials. In other words, while steel may be used for the cutter body, it is not necessary to use steel, and in fact certain advantages mentioned herein, may be found to result by the use of other materials for the cutter body, such as aluminum, cast iron, brass, bronze or plastics, and these advantages, especially the absorption of vibratory and shock forces within the cutter body, are such as to make for an important improvement in the machine tool art. Further, the use of the special stepped wedge construction on the cutters and the retaining wedges provides additional stability and resistance to vibration or destructive shock forces, by the elements mounted on the cutter body, so that severe and unusual shocks are easily handled during cutting operations without destruction or damage to the cutting edge.

I claim:

1. A machine tool comprising a machine tool body having an outer surface, and having a plurality of cutting blade seat areas formed on said outer surface and mutually spaced from each other, cutting blade members seated on each of said cutting blade seat areas, a plurality of stepped side surfaces formed on opposite sides of said cutting blade members, a plurality of radially biased fastening members disposed one between each adjacent pair of cutting blade members on the areas of said cutter tool body intermediate said cutting blade seat areas, a plurality of second stepped side surfaces formed on opposite sides of each of said fastening members and constructed and arranged to bear upon the corresponding stepped side surfaces on said cutting blade members, to exert a resultant force acting to retain said cutting blade members in secure engagement with their said cutting blade seat areas during movement of said cutter body and in cutting operations, and means acting upon said fastening members for securing the same to said machine tool body.

2. A machine tool comprising a machine tool body, a plurality of wedge means, radially acting fastening means engaging said wedge means for securing the same to mutually spaced areas on said machine tool body, each of said wedge means comprising opposite side surfaces with a plurality of pairs of mutually inwardly convergent step surfaces, cutting blade means constructed and arranged for being seated on said machine tool body so that one cutting blade means is disposed between each pair of adjacent wedge means, each of said cutting blade means comprising opposite side surfaces with a plurality of pairs of mutually inwardly divergent step surfaces, and constructed and arranged for bearing contact with said corresponding stepped surfaces on said wedge means, whereby, upon tightening of said fastening means, said step surfaces on said wedge means exerts bearing force on the intervening step surfaces of said cutting blade means, the resultant force acting upon said cutting means so as to hold the same securely upon said machine tool body against movement thereon, and for movement therewith.

3. The construction according to claim 2, wherein said fastening means comprises screw means radially penetrating each of said wedge means and threadedly engaging said machine tool body radially, whereby said screw means secures said wedge means for motion with said machine tool body.

4. The construction according to claim 2, wherein said machine tool body has a threaded radial bore opening upon each of said mutually spaced areas forming seats for said wedge means, and wherein each of said wedge means has a bore adapted to align with said radial bore in said machine tool body when seated on its said seat area, and screw means penetrating said wedge means bore and threaded into said radial bore in said machine tool body, and constructed and arranged for being tightened so as to move said wedge means toward seating engagement with said machine tool body.

5. The construction according to claim 2, wherein said machine tool body is formed of metal having a hardness which is less than that of steel.

6. The construction according to claim 2, wherein said machine tool body is formed of metal selected from the class consisting of aluminum, brass, and bronze, and copper.

7. The construction according to claim 2, wherein said machine tool body is formed of metal selected from the class consisting of aluminum and copper.

8. The construction according to claim 2, wherein said machine tool body is formed of an alloy of metal selected from the class consisting of brass and bronze.

9. The construction according to claim 2, wherein said machine tool body is formed of non-metallic composition of plastic material.

References Cited in the file of this patent

UNITED STATES PATENTS

| Number | Name | Date |
|---|---|---|
| 153,009 | Nesbitt | July 14, 1874 |
| 604,776 | Morton | May 31, 1898 |
| 1,037,146 | Hunter | Aug. 27, 1912 |
| 1,278,629 | Francis | Sept. 10, 1918 |
| 1,414,520 | Martin | May 2, 1922 |
| 1,650,290 | Metzger | Nov. 22, 1927 |
| 1,747,455 | Miller | Feb. 18, 1930 |
| 2,170,328 | Hoke | Aug. 22, 1939 |
| 2,173,848 | Kraus | Sept. 26, 1939 |
| 2,173,868 | Weddell et al. | Sept. 26, 1939 |
| 2,264,299 | Crosby | Dec. 2, 1941 |
| 2,325,746 | Curtis | Aug. 3, 1943 |
| 2,328,494 | Reaney | Aug. 31, 1943 |
| 2,348,759 | Sneed | May 16, 1944 |
| 2,407,921 | Deliso | Sept. 17, 1946 |
| 2,422,404 | Goehle | June 17, 1947 |
| 2,446,846 | Noble | Aug. 10, 1948 |
| 2,547,789 | Skeel | Apr. 3, 1951 |